US008244435B2

(12) United States Patent
Lauer et al.

(10) Patent No.: US 8,244,435 B2
(45) Date of Patent: Aug. 14, 2012

(54) METHOD AND SYSTEM FOR DETERMINING AN OPTIMAL STEERING ANGLE IN UNDERSTEER SITUATIONS IN A VEHICLE

(75) Inventors: Peter Lauer, Karben (DE); Thomas Raste, Oberursel (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 701 days.

(21) Appl. No.: 12/296,136

(22) PCT Filed: Apr. 26, 2007

(86) PCT No.: PCT/EP2007/054125
§ 371 (c)(1),
(2), (4) Date: Jun. 11, 2009

(87) PCT Pub. No.: WO2007/125083
PCT Pub. Date: Nov. 8, 2007

(65) Prior Publication Data
US 2009/0319128 A1 Dec. 24, 2009

(30) Foreign Application Priority Data

Apr. 27, 2006 (DE) .......................... 10 2006 020 279
Apr. 26, 2007 (DE) .......................... 10 2007 020 169

(51) Int. Cl.
*B62D 6/00* (2006.01)
(52) U.S. Cl. .......................................... 701/42; 180/6.2
(58) Field of Classification Search .............. 701/41–42; 180/6.2; 342/71; 475/18–19
See application file for complete search history.

(56) References Cited

U.S. PATENT DOCUMENTS

| | | | |
|---|---|---|---|
| 6,091,214 A | 7/2000 | Yamawaki et al. | |
| 6,449,542 B1 | 9/2002 | Böttiger et al. | |
| 2002/0183913 A1 | 12/2002 | Ehret et al. | |
| 2004/0015284 A1 | 1/2004 | Suissa | |
| 2005/0080543 A1* | 4/2005 | Lu et al. | 701/70 |
| 2005/0189161 A1 | 9/2005 | Zheng et al. | |
| 2006/0136112 A1 | 6/2006 | Lin et al. | |
| 2007/0005212 A1* | 1/2007 | Xu et al. | 701/70 |
| 2008/0040002 A1 | 2/2008 | Galkoswki et al. | |
| 2008/0077295 A1 | 3/2008 | Holzmann et al. | |

FOREIGN PATENT DOCUMENTS

| | | |
|---|---|---|
| DE | 44 19 650 A1 | 7/1995 |
| DE | 198 42 439 A1 | 3/1999 |
| DE | 198 51 978 A1 | 5/2000 |
| DE | 100 39 782 A1 | 2/2002 |
| DE | 10 2005 012548 A1 | 2/2006 |
| DE | 10 2005 036 708 | 8/2006 |
| DE | 112005003154 T5 | 10/2007 |
| EP | 1 225 109 A2 | 7/2002 |
| WO | WO 2005/054039 A1 | 6/2005 |
| WO | WO 2005/054040 A1 | 6/2005 |

* cited by examiner

Primary Examiner — Yonel Beaulieu
(74) Attorney, Agent, or Firm — RatnerPrestia (57) ABSTRACT

A method for determining an optimal steering angle in understeer situations of a vehicle is described. To assist a driver in reliably stabilizing the vehicle during an understeer situation while driving, a model-based driving traction coefficient factor, a model-based kinematic factor, and a float angle are taken into account in the determination of a steering angle. A limited steering angle $\delta_{v,lim}$ at which a maximum lateral force is set, is determined by addition of the driving traction coefficient factor, the kinematic factor, and the float angle. A system suitable for implementation of the method is also described.

7 Claims, 8 Drawing Sheets

METHOD AND SYSTEM FOR DETERMINING AN OPTIMAL STEERING ANGLE IN UNDERSTEER SITUATIONS IN A VEHICLE

CROSS REFERENCE TO RELATED APPLICATIONS

This application is the U.S. national phase application of PCT International Application No. PCT/EP2007/054125, filed Apr. 26, 2007, which claims priority to German Patent Application No. DE102006020279.1, filed Apr. 27, 2006 and German Patent Application No. DE102007020169.0, filed Apr. 26, 2007, the contents of such applications being incorporated by reference herein in their entirety.

BACKGROUND OF THE INVENTION

1. Field of the Invention

The invention relates to a device and method for determining an optimum steering angle in understeer situations of a vehicle.

2. Description of the Related Art

Modern vehicles use electronically controllable motors in the steering train in order, on the one hand, to selectively influence the steering torque to be applied by the driver (power steering systems) and, on the other hand, to selectively set steering angles independently of the driver (superimposition steering systems). In addition to these steering systems which act on the front axle of the vehicle, modern chassis control systems, for example global chassis control (GCC) also use rear axle steering systems for controlling the vehicle dynamics.

In order to influence the steering torque which is to be applied by the driver, various closed-loop and open-loop control structures which are respectively aimed at the specific driving situation are known. For example in the case of oversteering driving situations, closed-loop control on the basis of a yaw rate reference is used (WO 2005/054039 A1) and in the case of braking on μ split open-loop control on the basis of ABS wheel information is used (WO 2005/054040 A1). In the case of understeering driving situations, the steering angle which is present when the situation is detected is "frozen", i.e. by means of a torque control is to be recommended to the driver that he should not increase the steering angle and as a result make the situation worse. A disadvantage with this concept is that the driver is not provided with any feedback about the maximum possible lateral force.

It would therefore be desirable if the driver could be assisted in such a way that he can set a maximum lateral force at the wheels.

DE 10 2005 036 708 A1 discloses stabilizing means which actuate the steering means as a function of a lateral force coefficient of at least one of the steered wheels in order to set a steering angle which stabilizes the vehicle, in which case the stabilizing means set a slip angle of the steered wheels in such a way that the lateral force coefficient does not substantially exceed the region of the maximum.

SUMMARY OF THE INVENTION

The invention relates to improving a method of the type mentioned previously in such a way that during an understeering driving situation the driver is reliably assisted in stabilizing the vehicle.

The invention makes available a method for determining an optimum steering angle in understeering situations of a vehicle, in which method a first portion which represents the adhesion coefficient in the lateral direction is taken into account in the determination, in which method a second portion which represents a kinematic portion is taken into account, and in which method a third portion which represents the attitude angle is taken into account, and in which method the steering angle $\delta_{v,lim}$ is determined by adding the portion of the adhesion coefficient, the kinematic portion and the attitude angle.

The kinematic portion comprises the proportional velocities from the rotation of the vehicle referred to the velocity of the center of gravity.

The system for controlling electronically controllable motors in the steering train advantageously permits the driver to set the maximum lateral force value in understeering situation by means of power steering. This assistance during steering allows the vehicle to be stabilized in critical driving situations. All wheel steering systems are taken into account here.

During the understeering, the attitude angle can advantageously be estimated according to the relationship $\beta \approx 0$, since the attitude angle is approximately zero at the start of the understeering driving situation.

The coefficient of friction of the underlying surface is advantageously determined at the axles and the center of gravity of the vehicle. The coefficient of friction $\hat{\mu}_0 = \max(\mu_{VA}, \mu_{CoG}, \mu_{HA})$ of the underlying surface is determined according to at least one of the relationships, utilizing the adhesion for the front axle $$\mu_{VA} = \frac{\sqrt{(a_x - l_V \dot{\psi}^2)^2 + (a_y + l_V \ddot{\psi})^2}}{g},$$

or
utilizing the adhesion at the center of gravity of the vehicle $$\mu_{CoG} = \frac{\sqrt{a_x^2 + a_y^2}}{g},$$

or
using the adhesion at the rear axle $$\mu_{HA} = \frac{\sqrt{(a_x - l_H \dot{\psi}^2)^2 + (a_y + l_H \ddot{\psi})^2}}{g}.$$

The optimum steering angle is advantageously calculated in a model in which the steering angle is determined in terms of absolute value according to the relationship $$\delta_{V,lim} = \frac{l_V}{v_x}|\dot{\psi}| + \frac{2}{C_{\alpha 0}}\hat{\mu}_0.$$

The steering angle $\delta_{v,lim}$ or a steering angle $\delta_{v,lim}$ which is multiplied by a factor k is used as a setpoint value for a steering angle control means or a steering torque control means.

Furthermore, there is advantageously provision that a steering torque control means is activated according to the relationship $\delta_{v,lim} < |\delta_v|$
or deactivated according to the relationship $\delta_{v,lim} < |\delta_v|$.

Furthermore, the invention makes available an advantageous device for carrying out the method according to aspects of the invention.

The device for determining an optimum steering angle in understeering situations of a vehicle is based on a determining unit for determining a stabilizing steering angle taking into account a model-based portion of the adhesion coefficient, a model-based kinematic portion and an attitude angle.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
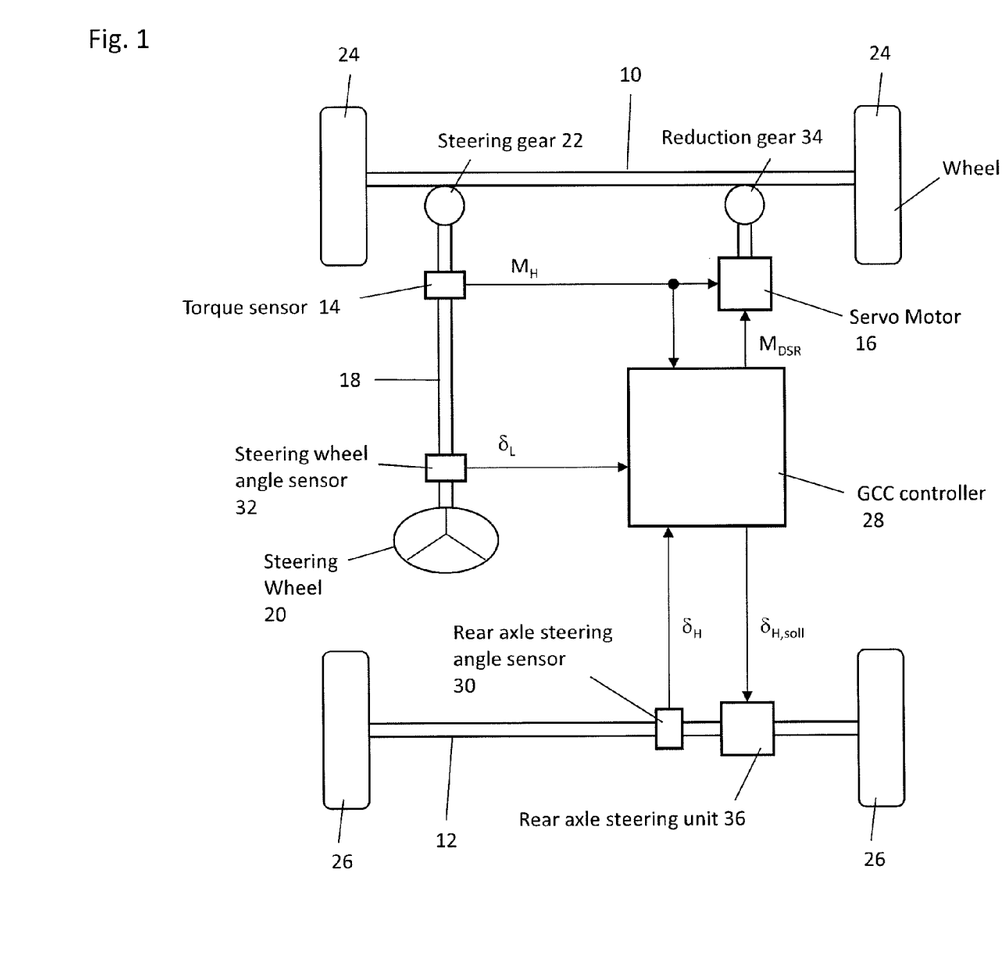
FIG. 1 is a block circuit diagram with an overview of a control system of an electric power steering system for determining a steering torque.

The description is based on a two-axle, four-wheel motor vehicle having steerable wheels on at least one front axle 10 and, if appropriate, also on a rear axle 12. FIG. 1 is a schematic illustration of a vehicle having a steering actuator. A steering wheel 20 which is attached to a steering column 18 is connected via a steering gear 22 to the steered wheels 24, 26 of the vehicle. The steering gear 22 is preferably embodied as a toothed rack steering system which has a pinion (not illustrated), which is connected to the steering column in a rotationally fixed fashion. A torque sensor 14, which determines the driver's steering request here by means of a manual steering toque $M_H$ is arranged on the steering column. An electrical EPS servomotor 16 (EPS=Electric Power Steering) applies an additional steering torque $M_{DSR}$ to the steering train during conventional operation, which steering torque $M_{DSR}$ increases the steering torque $M_H$ applied by the driver.

In order to set an additional steering torque request $M_{DSR}$ (DSR=Driver Steering Recommendation) to assist the driver, the electric power steering system is used, said electric power steering system being actuated here by a, for example, GCC controller 28 (GCC=Global Chassis Control), for example via an interface with the CAN bus of the vehicle. The steering wheel angle $\delta_L$ which is set by the driver and the rear axle steering angle $\delta_H$, which are measured with steering angle sensors 30, 32 which are arranged on the steering column 18 and on the rear axle 12, and the manual steering torque $M_H$ which is determined by the torque sensor 14 are made available to the controller 28 as input variables. Furthermore, the controller 28 is provided with additional variables from the vehicle dynamics controllers and/or driver assistance controllers, as described in more detail in the applications mentioned previously. The controller 28 determines the additional steering torque $M_{DSR}$ by means of the information which is made available. The EPS servomotor 16 serves here as an actuator which applies the steering torque $M_{DSR}$ (DSR=Driver Steering Recommendation) to the steering train in correlation with the manual steering torque $M_H$ via the transmission 34. Furthermore, the controller 28 calculates a rear axle steering angle $\delta_{H,soll}$, which is transmitted to the rear axle via a rear axle steering unit 36.

However, in a similar way, the invention can also be used in vehicles with other steering systems such as, for example, steering systems with hydraulic power steering with an external torque interface (for example APS, Active Power Steering) or a separate torque actuator (for example IPAS, Intelligent Power Assisted Steering).

Figure 2:
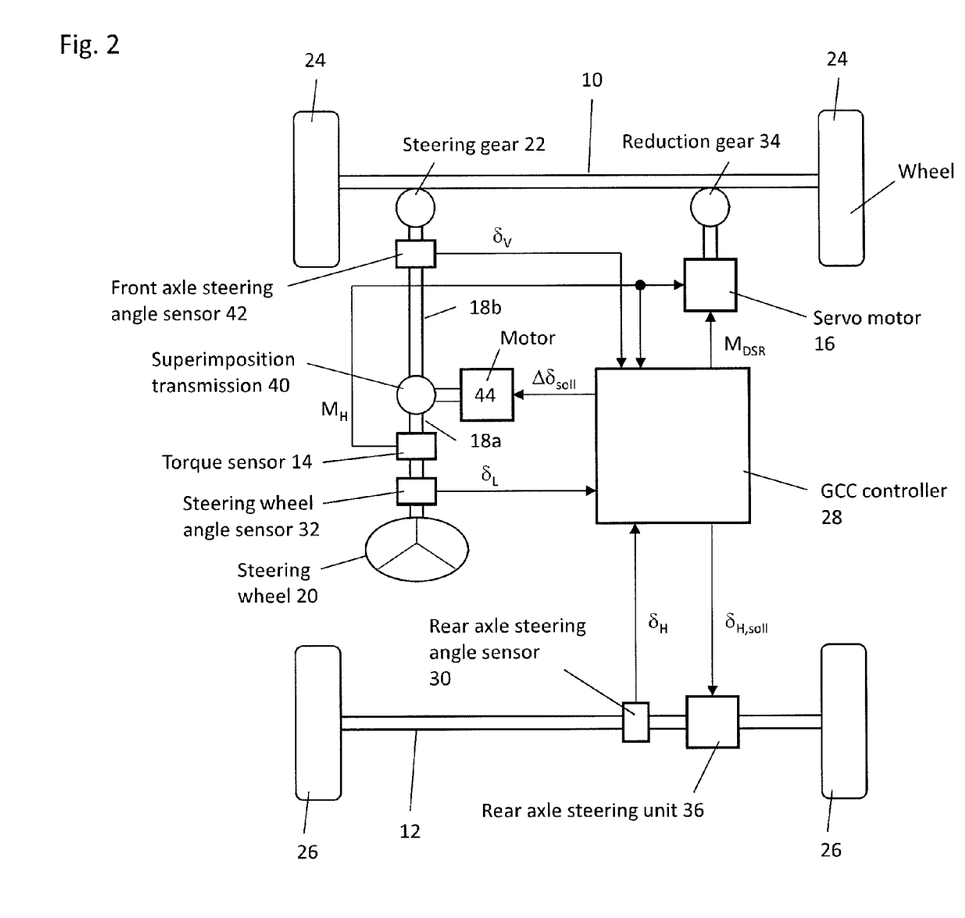
FIG. 2 is a block circuit diagram with an overview of a control system of a superimposition steering system for determining a steering torque.

FIG. 2 shows a power steering system with two steering actuators. Identical components and identical blocks have the same reference symbols here. In addition, compared to the embodiment according to FIG. 1, a superimposition transmission 40 is arranged on the steering column 18. The superimposition transmission is generally embodied as a planetary gear mechanism and divides the steering column into two sections 18a and 18b. By means of the superimposition transmission 40 it is possible to superimpose a further steering angle on the steering wheel angle $\delta_L$ measured by the steering wheel angle sensor 32. The composite steering angle $\delta_V$ is measured by the steering angle sensor 42 which is arranged on the section 18b of the steering column. The superimposition transmission 40 is driven by a steering wheel motor 44. The steering wheel motor 44 is controlled by the controller 28 whose reference variable is the correction steering wheel angle $\Delta\delta_{soll}$. For this purpose, the steering angle $\delta_V$ which is measured by the front axle steering wheel sensor 42 is made available to the controller 28. As in the control system described in FIG. 1, the controller 28 is provided with further variables from vehicle dynamics controllers and/or driving assistance controllers.

The wheel steering angle of the front axle $\delta_V$ is included in the additional steering torque $M_{DSR}$ according to the relationship $$\delta_V = \frac{\delta_L}{i_L} \quad (2.1)$$

where $i_L$ is the steering transmission ratio. The steering transmission ratio is constant or, in the case of a superimposition steering system, it can also depend on further variables such as, for example, the velocity of the vehicle.

In the case of a steering angle control, the wheel steering angle of the front axle is measured directly.

In the case of the servomotors 16 which are illustrated in FIGS. 1 and 2, the servomotor is preferably required to receive a setpoint steering torque from the GCC controller and to control it independently in the manner of an "intelligent actuator". The current manual steering torques $M_H$ are acquired by the torque sensor 14 and fed back to the GCC controller 28. The torque sensor 14 is optional, an IPAS does not contain a torque sensor. The presence of a rear axle steering system is not absolutely necessary for the method. However, the further statements assume that the vehicle is equipped with a rear axle steering unit (for example ARK, Active Rear Axle Kinematics). The method for calculating the maximum steering angle is also suitable for pure superimposition steering as per FIG. 2, in order to apply this value independently of the value specified by the driver.

Figure 3:
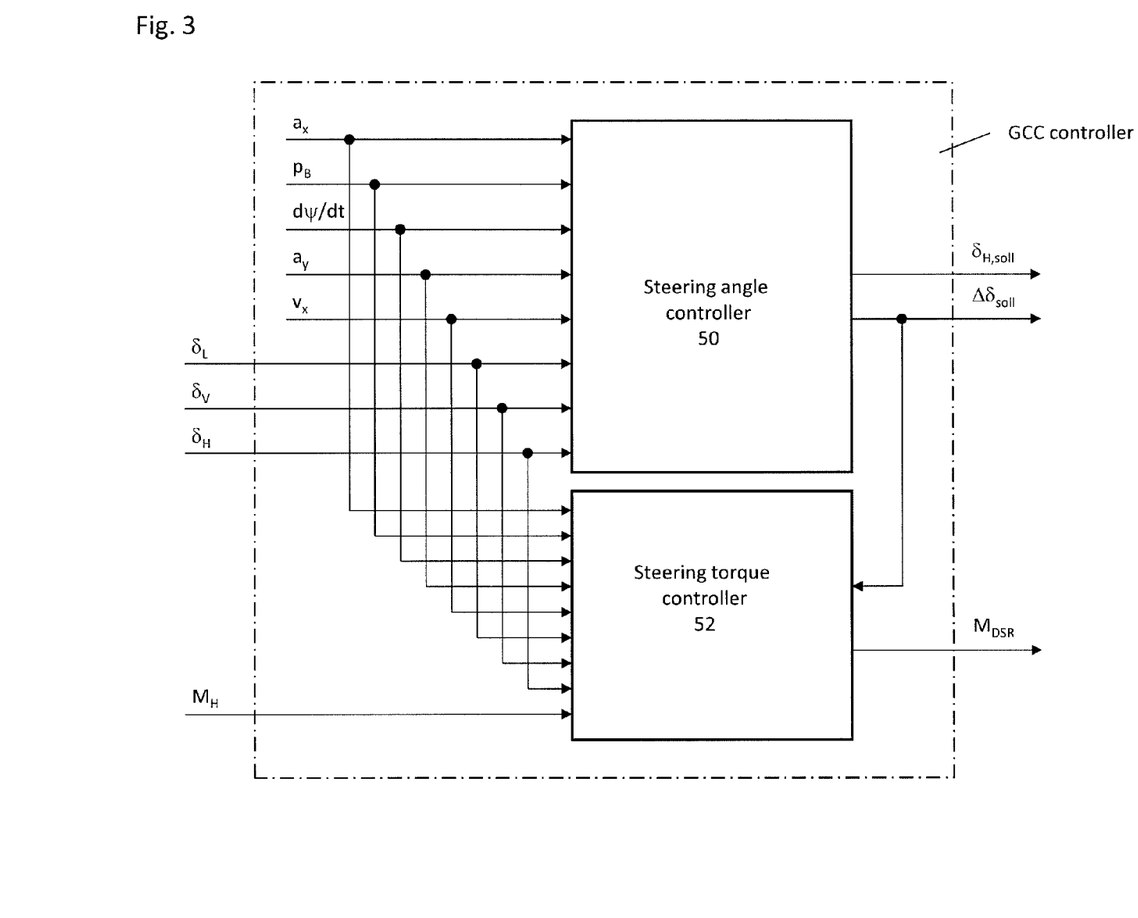
FIG. 3 shows a refinement of the controller illustrated in FIGS. 1 and 2, with the controller portions which relate to the steering.

The components and interfaces of the GCC controller 28 are represented in FIG. 3. Only the portions which relate to the steering are illustrated. Controller portions for other actuators such as, for example a brake, internal combustion engine, stabilizer etc. are not illustrated. The steering angle controller 50 and the steering torque controller 52 are either alternatively present or are present together for steering systems as illustrated in FIG. 2. The steering angle controller 50 generates steering angle setpoint values $\Delta\delta_{soll}$, $\delta_{H,soll}$ for the front axle 10 and the rear axle 12. The steering torque controller 52 generates the additional steering torque $M_{DSR}$ which, as a driver steering recommendation (DSR, Driver Steering Recommendation), constitutes a haptic feedback for the driver. The following variables are made available as input variables to the steering wheel controller 50 and the steering torque controller 52:

$a_x$ longitudinal acceleration, measured with a longitudinal acceleration sensor or estimated from wheel speed signals
$p_B$ brake pressure, measured with a pressure sensor (1× driver) or estimated at the wheel brakes of the respective wheels 24, 26 or in a model for the four wheel brakes of the wheels 24, 26
$d\psi/dt$ yaw rate
$a_y$ lateral acceleration
$v_x$ velocity of vehicle, estimated from wheel speed signals
$\delta_L$ steering wheel angle
$\delta_V$ wheel steering angle front axle
$\delta_H$ wheel steering angle rear axle In addition, the driver manual torque $M_H$ which is determined by the torque sensor 14 is also supplied as an input variable to the steering torque controller 52. If the steering angle controller 50 is also present, the change in setpoint in the wheel steering angle $\Delta\delta_{soll}$ is additionally fed as an input variable to the steering torque controller 52.

Figure 4:
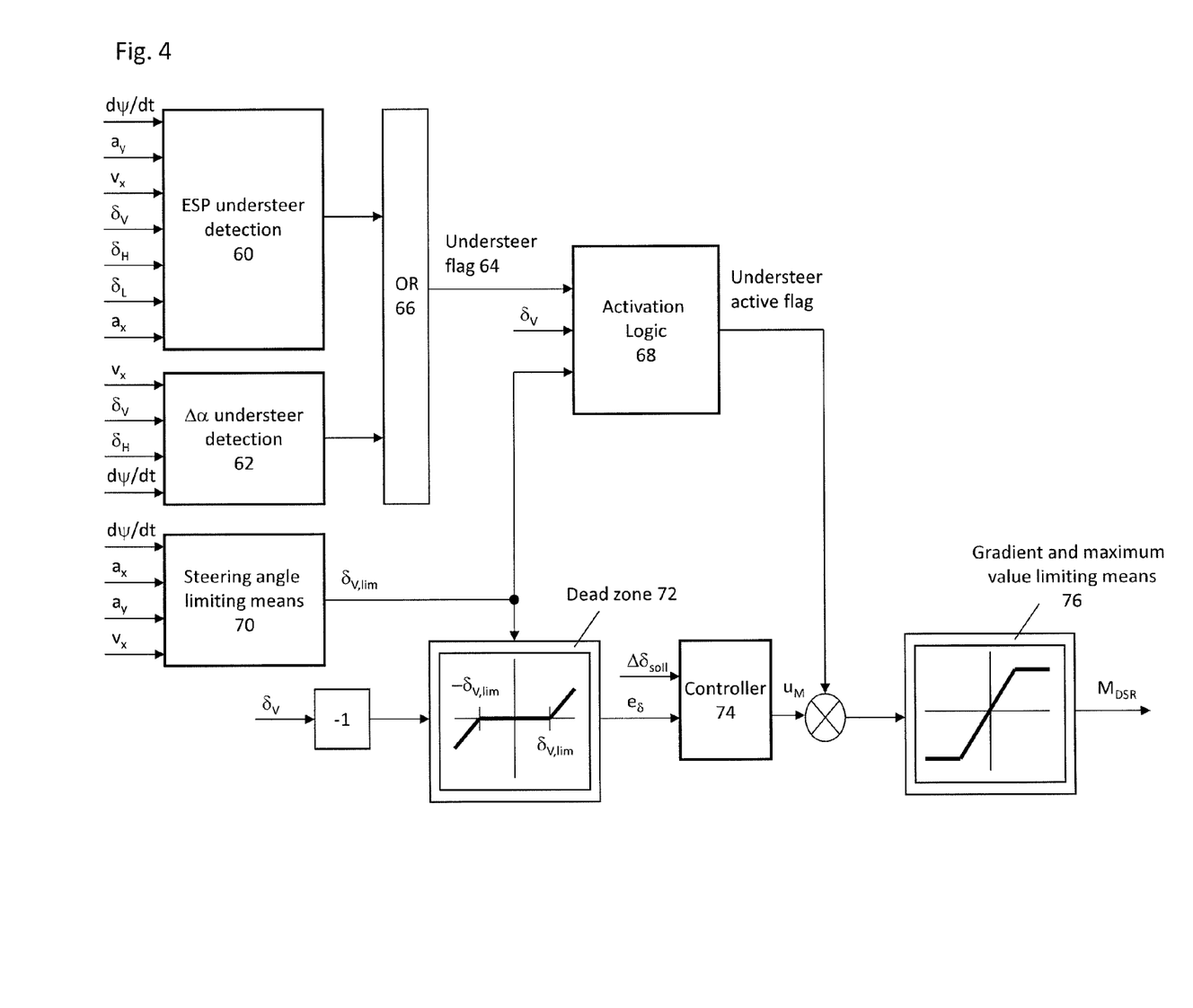
FIG. 4 shows an embodiment of a block of the block circuit diagram which is illustrated in FIG. 2 and which determines a steering torque.
Figure 5:
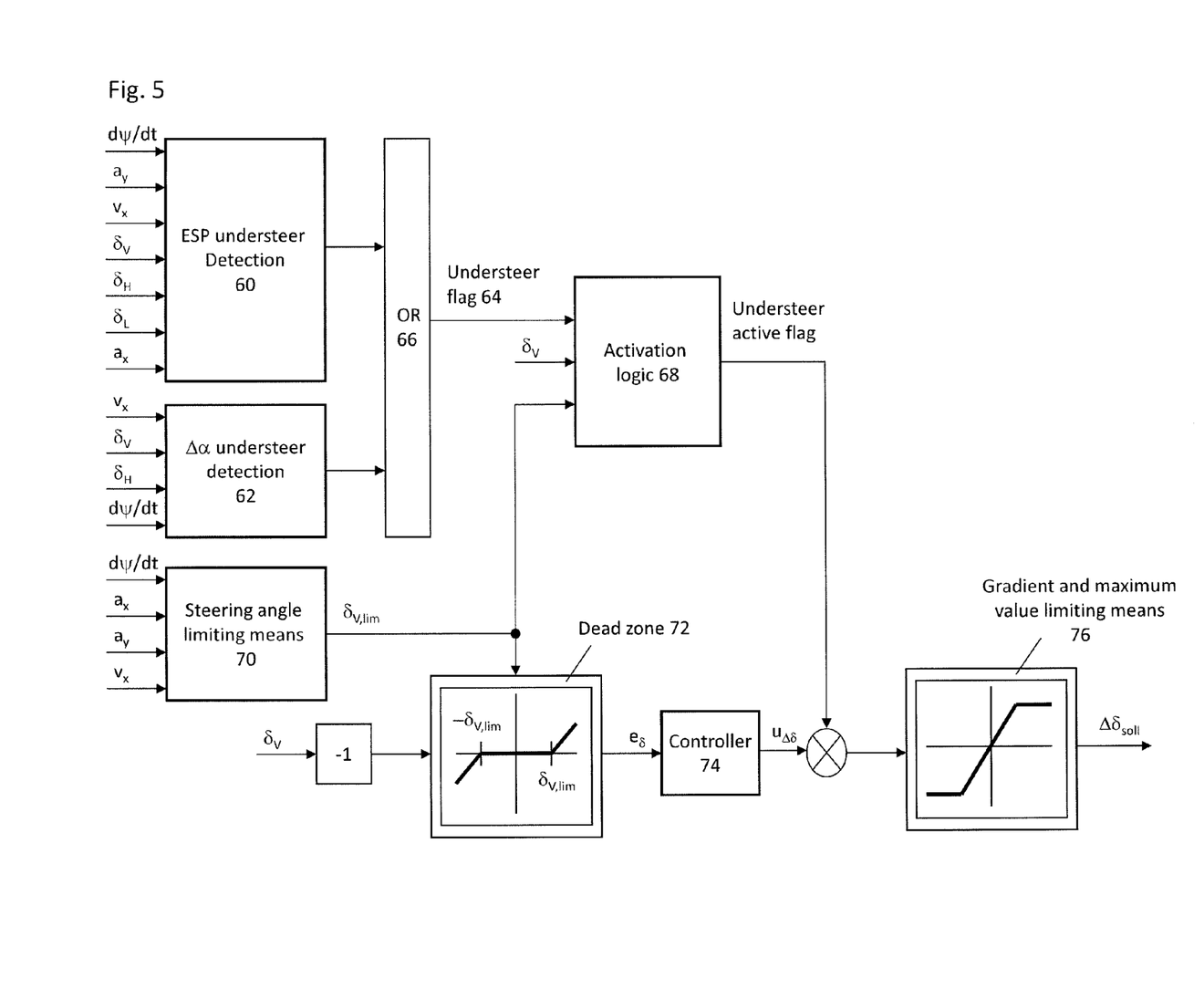
FIG. 5 shows a first embodiment of a block of the block circuit diagram which is illustrated in FIG. 2 and has the purpose for determining an additional steering angle.

An exemplary embodiment of the steering torque controller 52 in understeering situations is illustrated in FIG. 4. An exemplary embodiment of the steering angle controller 50 in understeering situations is shown by FIG. 5.

Both controller 50, 52 have the following basic design of the steering train control system for determining the steering torque request $M_{DSR}$ or the steering angle request $\Delta\delta_{soll}$. Driving situations in which an understeering driving state of the vehicle is present are detected in the blocks 60 and 62. Said blocks make use, in particular, of information which is made available by a vehicle dynamics controller. The driving state controller can be, for example, an ESP system and/or an ABS system. Critical driving situations in which the vehicle understeers are preferably detected in the block 60 by means of an ESP understeering detection means. As an alternative, understeering of the vehicle is detected in the block 62 by means of a slip angle understeering detection means.

The detection of an understeering situation is carried out here at both controllers 50, 52 according to two alternatives. An understeering detection means which is expanded with the rear axle steering portion and consists in the ESP uses the linear steady-state single-track model.

$$\dot{\psi} = \frac{v_x}{l + EGv_x^2}(\delta_V - \delta_H). \qquad (3.1)$$

The model (3.1) supplies a reference for the front axle steering angle in the form $$\delta_{V,ref} = \frac{l}{v_x}\dot{\psi} + EGa_y + \delta_H. \qquad (3.2)$$

Figure 7:
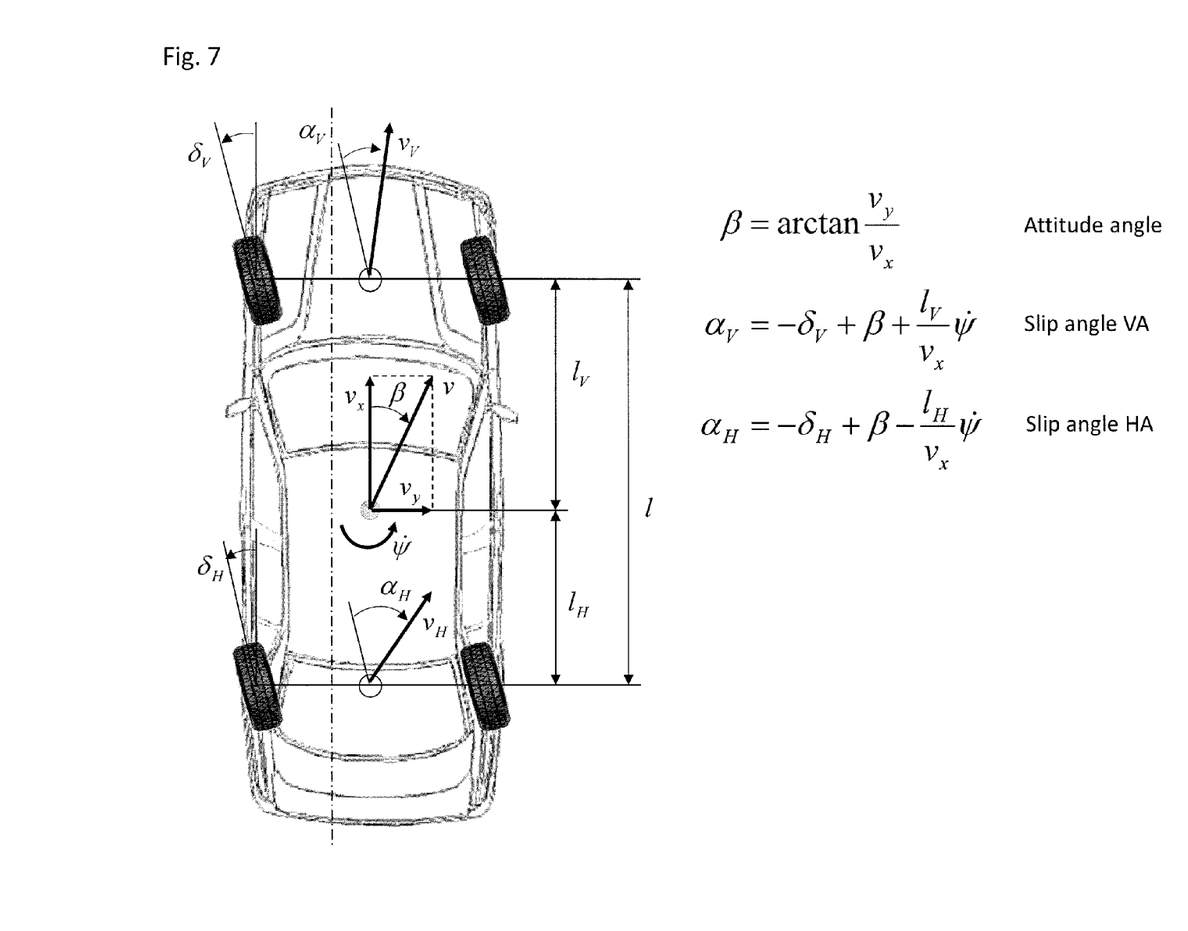
FIG. 7 shows an illustration of the reference variables on a vehicle with the models for the determination of the slip angle and the attitude angle.

Understeering is detected if the difference $$|\delta_V| - |\delta_{V,ref}| > S_\delta \qquad (3.3)$$

exceeds a predefined threshold value $S_\delta$. The second possible way of detecting understeering is based on the slip angle at the front axle.

$$\alpha_V = -\delta_V + \beta + \frac{l_V}{v_x}\dot{\psi}. \qquad (3.4)$$

and the slip axle at the rear axle, cf. FIG. 7, $$\alpha_H = -\delta_H + \beta - \frac{l_H}{v_x}\dot{\psi}. \qquad (3.5)$$

The detection requires not only the individual slip angles but also the difference $$\Delta\alpha = \alpha_V - \alpha_H = \delta_H - \delta_V + \frac{l}{v_x}\dot{\psi}. \qquad (3.6)$$

Understeering is detected as a function of a threshold value for the difference (3.6) between the slip angle and the sign of the yaw rate if the following is true $d\psi/dt > 0$ and $\Delta\alpha < -S_\alpha$ or $d\psi/dt < 0$ and $\Delta\alpha > S_\alpha$ The threshold value $S_\alpha$ is between 2 and 10 degrees, and is preferably 5 degrees. If an understeering situation is detected in one of the blocks 60, 62 from the upward transgression of the threshold values $S_\delta$ or $S_\alpha$, the understeer flag 64, which is the output signal of the block 60 or 62, is set to the value 1. The understeer flag is reset from the value 1 to the value 0 if the aforesaid conditions are no longer met. However, relatively small threshold values are preferably used as the basis so that the control is steadied by a hysteresis.

The threshold values may be dependent on further variables of the vehicle dynamics such as, for example, the velocity $v_x$ of the vehicle or the coefficient of friction $\mu$ of the underlying surface. As the velocity decreases, the threshold values are increased, and as the coefficient of friction of the underlying surface decreases they are correspondingly decreased.

The blocks 60, 62 are connected via an OR element 66 to an activation logic 68 for activating the control system. The wheel steering angle $\delta_V$ of the front axle, the limited wheel steering angle $\delta_{V,lim}$ of the front axle, the determination of which will be described later, and the understeer flag 64 are input into the activation logic 68 as the input signal.

If the following conditions are met $$\delta_{V,lim} < |\delta_V| \qquad (5)$$

and understeer flag=1
the steering torque control 52 is activated by an understeer active flag, which represents the output signal of the activation logic 68, being set to the value 1.

The torque control 52 is terminated and the output signal understeer active flag of the activation logic 68 is set to 0 if the following conditions apply:

$\delta_{V,lim} > |\delta_V|$ or understeer flag=0
or after termination conditions which provide for a termination after a predetermined time has expired.

Each of the controllers 50, 52 contains a determining unit 70 for limiting the steering angle, to which determining unit 70 the yaw rate $d\Psi/dt$, the longitudinal acceleration $a_x$, the lateral acceleration $a_y$, and the velocity $v_x$, of the vehicle are added as input variables.

The limitation of the steering angle serves to determine a limitation of the wheel steering angle at the front axle. For this purpose the following polynomial model of the lateral force is used $$F_y = \begin{cases} -\left(C_{\alpha 0}F_z\alpha - \mathrm{sign}(\alpha)\frac{C_{\alpha 0}^2 F_z^2}{4\mu_0 F_z}\alpha^2\right)\sqrt{1 - \left(\frac{F_x}{\mu_0 F_z}\right)^2}, & |\alpha| < \frac{2\mu_0}{C_{\alpha 0}} \\ -\mathrm{sign}(\alpha)\mu_0 F_z\sqrt{1 - \left(\frac{F_x}{\mu_0 F_z}\right)^2}, & |\alpha| \geq \frac{2\mu_0}{C_{\alpha 0}} \end{cases} \qquad (3.7)$$

Figure 8:
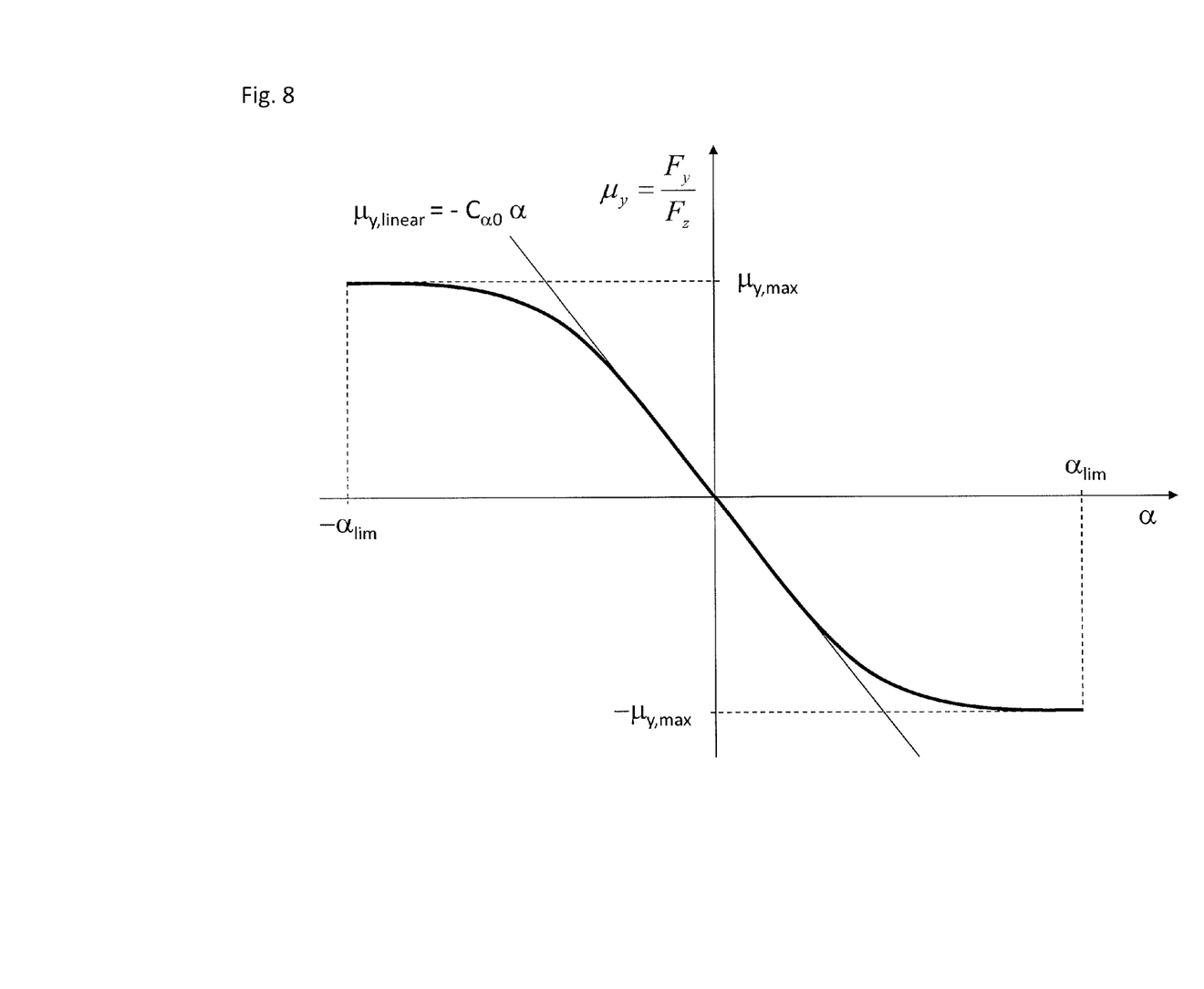
FIG. 8 shows a characteristic curve of the adhesion coefficient in the lateral direction.

If the lateral force $F_y$ is related to the vertical force $F_z$, the characteristic curve of the adhesion coefficient in the lateral direction which is illustrated in FIG. 8 is obtained from the model (3.7). The adhesion coefficient reaches its maximum value at the slip angle $$\alpha_{lim} = \mu_0 \frac{2}{C_{\alpha 0}} \qquad (3.8)$$

The steering angle corresponding to the maximum adhesion coefficient can be determined, from (3.4) using (3.8), as $$\delta_V\big|_{\alpha_V=\alpha_{lim}} = \frac{l_V}{v_x}\dot\psi - \mathrm{sign}(\alpha_V)\mu_0\frac{2}{C_{\alpha 0}} + \beta. \qquad (3.9)$$

The coefficient of friction $\mu_0$ of the underlying surface and the attitude angle $\beta$ cannot be acquired economically in terms of measuring technology in the vehicle. In the case of understeering, the following applies approximately to the attitude angle $$\beta \approx 0. \qquad (3.10)$$

An estimation of the coefficient of friction of the underlying surface on the basis of the accelerations of the center of gravity of the vehicle (CoG Center of Gravity) or of the front and rear axles yields $$\hat\mu_0 = \max(\mu_{VA},\mu_{CoG},\mu_{HA}), \qquad (3.11)$$

using the adhesion for the front axle $$\mu_{VA} = \frac{\sqrt{(a_x - l_V\dot\psi^2)^2 + (a_y + l_V\ddot\psi)^2}}{g}, \qquad (3.12)$$

using the adhesion at the center of gravity of the vehicle $$\mu_{CoG} = \frac{\sqrt{a_x^2 + a_y^2}}{g} \qquad (3.13)$$

and using the adhesion at the rear axle $$\mu_{HA} = \frac{\sqrt{(a_x + l_H\dot\psi^2)^2 + (a_y - l_H\ddot\psi)^2}}{g}. \qquad (3.14)$$

Taking into account the relationship of the signs of the slip angle and lateral acceleration $$\mathrm{sign}(\alpha_{lim}) = -\mathrm{sign}(a_y) \qquad (3.15)$$

the aimed-at limitation of the wheel steering angle at the front axle is obtained, in terms of absolute value, as $$\delta_{V,lim} = \frac{l_v}{v_x}|\dot\psi| + \frac{2}{C_{\alpha 0}}\hat\mu_0 \qquad (3.16)$$

The parameter $C_{\alpha}$ may be dependent on the coefficient of friction of the underlying surface and has to be applied in the driving trial.

A small attitude angle is assumed for the calculation of the limitation of the steering angle according to (3.10). It has to be assumed that the vehicle initially veers in and the attitude angle therefore increases. For this reason, the limitation should be performed only for a certain time (preferably 4 s). In a haptic system, the increase in the steering torque should then be cancelled. In a superimposition steering system, the additional steering angle is reduced again after this time.

The limited wheel steering angle $\delta_{V,lim}$ which is calculated in accordance with 3.16 is made available to the activation logic 68 which activates or terminates the steering torque control 52 on the basis of the previously described conditions.

In order to control the steering torque or steering angle, the current wheel steering angle $\delta_V$ of the front axle passes with reversed sign through a transmission element 72 with a dead zone. The dead zone is defined between the positive and negative values of the current limitation for the wheel steering angle (3.16). The output variable of the dead zone transmission element 72 is the control error $$e_\delta = \begin{cases} -\delta_V - \delta_{V,lim} & f\ddot{u}r \quad -\delta_V \geq \delta_{V,lim} \\ 0 & f\ddot{u}r \quad -\delta_V > -\delta_{V,lim} \\ -\delta_V + \delta_{V,lim} & sonst \end{cases} \qquad (3.17)$$

Figure 6:
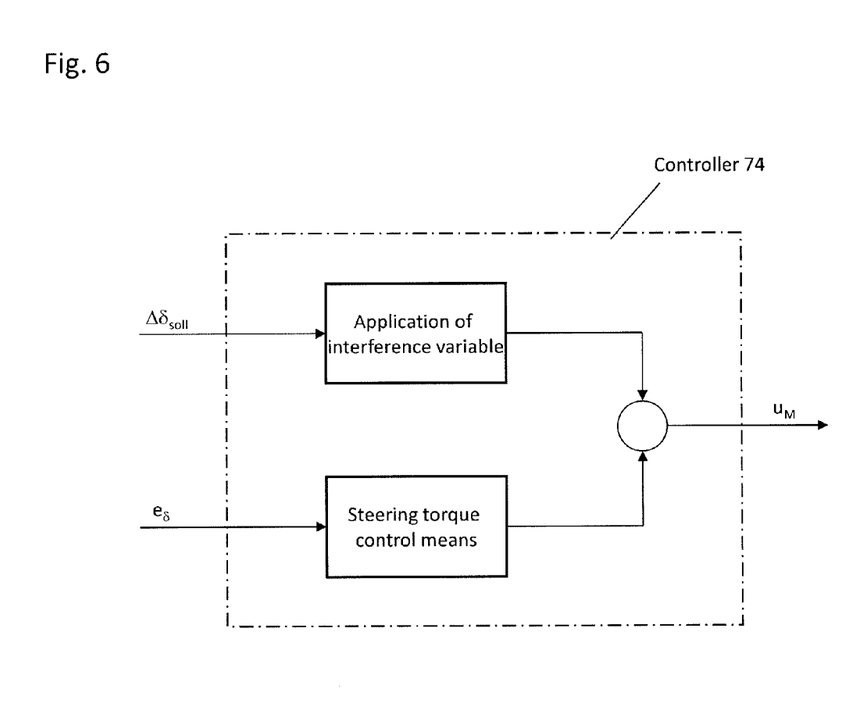
FIG. 6 shows an embodiment of a block for applying interference variables for the torque controller.

Within the dead zone, the control error is zero, and outside it said value is the value of the wheel steering angle $\delta_V$ which is reduced by the value of the limitation. The control error $e_\delta$ is fed to a controller 74. The controller 74 can be embodied as a simple P controller or as a dynamic controller. If a superimposition steering system (FIG. 5) is present, the set point change $\Delta\delta_{soll}$ in the wheel steering angle cannot be used as a pilot control in the sense of applying different variables for the steering torque control of the steering torque controller 52, in accordance with the illustration in FIG. 6. The controller output variable $u_M$ or $u_{\Delta\delta}$ is, if appropriate, restricted in terms of its value and its increase by the limiting element 76. The parameters of the controller 74 and of the limiting element 76 should be set as a function of the vehicle. A limitation taking into account the current manual torque of the driver is also possible.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

LIST OF REFERENCE SYMBOLS $a_x$ Longitudinal acceleration, if appropriate estimated from wheel speed signals
$p_B$ Brake pressure, 1× driver, 4× wheels, if appropriate estimated $d\Psi/dt$, $\Psi$ Yaw rate
$a_y$ Lateral acceleration
$v_x$ Velocity of vehicle, estimated from wheel speed signals
$\delta_L$ Steering wheel angle
$\delta_v$ Wheel steering angle, front axle
$\delta_{v,lim}$ Limitation of wheel steering angle, front axle
$\delta_{v,ref}$ Reference value wheel steering angle, front axle
$\Delta\delta_{soll}$ Setpoint wheel steering angle change, front axle
$\delta_H$ Wheel steering angle, rear axle
$\delta_{H,soll}$ Setpoint wheel steering angle, rear axle
$M_H$ Driver's manual torque on steering wheel
$M_{DSR}$ Setpoint steering torque
$\beta$ Attitude angle
$\alpha$ Slip angle
$\alpha_{lim}$ Slip angle at maximum angle of lateral force or maximum value of adhesion coefficient
$\Delta\alpha$ Difference in slip angle between front axle and rear axle $\alpha_v$-$\alpha_H$
$F_y$ Lateral force
$F_z$ Vertical force
$\mu_0$ Coefficient of friction of underlying surface
$\mu_y$ Adhesion coefficient in lateral direction
$\mu_{y,max}$ Maximum value of cohesion of adhesion coefficient
$C_{\alpha0}$ Initial rise in adhesion coefficient/slip angle curve
EG Intrinsic steering gradient
I Wheel base
$I_v$ Distance between center of gravity of vehicle and front axle
$I_H$ Distance between center of gravity of vehicle and rear axle
$e_\delta$ Control error

The invention claimed is:

1. A method for determining an optimum steering angle ($\delta_{v,lim}$) in understeering situations of a vehicle comprising the steps of:
(a) accounting for a first portion which represents an adhesion coefficient in a lateral direction;
(b) accounting for a second portion which represents a kinematic portion;
(c) accounting for a third portion which represents an attitude angle by estimating the attitude angle during the understeering according to a relationship $\beta\approx0$, wherein $\beta$ is defined as the attitude angle; and
(d) adding the portion of the adhesion coefficient, the kinematic portion and the attitude angle to calculate the steering angle ($\delta_{v,lim}$).

2. A method for determining an optimum steering angle ($\delta_{v,lim}$) in understeering situations of a vehicle comprising the steps of:
(a) accounting for a first portion which represents an adhesion coefficient in a lateral direction by accounting for a coefficient of friction of an underlying surface ($\hat{\mu}_0$) that is defined by the equation $\hat{\mu}_0=\max(\mu_{va}, \mu_{CoG}, \mu_{HA})$, wherein $\mu_{va}$ represents the adhesion for a front axle of the vehicle and is defined by the equation $$\mu_{VA} = \frac{\sqrt{(a_x - l_V\dot{\psi}^2)^2 + (a_y + l_V\ddot{\psi})^2}}{g},$$

$\mu_{CoG}$ represents the adhesion at a center of gravity of the vehicle and is defined by the equation $$\mu_{CoG} = \frac{\sqrt{a_x^2 + a_y^2}}{g},$$

and $\mu_{HA}$ represents the adhesion at a rear axle of the vehicle and is defined by the equation $$\mu_{HA} = \frac{\sqrt{(a_x + l_H\dot{\psi}^2)^2 + (a_y - l_H\ddot{\psi})^2}}{g},$$

wherein $a_x$ is defined as a longitudinal acceleration of the vehicle, $a_Y$ is defined as a lateral acceleration of the vehicle, $I_v$ is defined as a distance between a center of gravity and the front axle of the vehicle, $I_H$ is defined as a distance between a center of gravity and the rear axle of the vehicle, $\psi$ is defined as yaw of the vehicle, and g is a gravity constant;
(b) accounting for a second portion which represents a kinematic portion;
(c) accounting for a third portion which represents an attitude angle; and
(d) adding the portion of the adhesion coefficient, the kinematic portion and the attitude angle to calculate the steering angle ($\delta_{v,lim}$).

3. The method as claimed in claim 2, wherein the steering angle is determined by the equation:

$$\delta_{V,lim} = \frac{l_V}{v_x}|\dot{\psi}| + \frac{2}{C_{\alpha 0}}\hat{\mu}_0,$$

wherein $v_X$ is defined as the velocity of vehicle and $C_{\alpha0}$ is defined as an initial rise in the adhesion coefficient.

4. A method for determining an optimum steering angle ($\delta_{v,lim}$) in understeering situations of a vehicle comprising the steps of:
(a) accounting for a first portion which represents an adhesion coefficient in a lateral direction;
(b) accounting for a second portion which represents a kinematic portion;

(c) accounting for a third portion which represents an attitude angle;
(d) adding the portion of the adhesion coefficient, the kinematic portion and the attitude angle to calculate the steering angle ($\delta_{v,lim}$); and
(e) using the steering angle $\delta_{v,lim}$ or a steering angle $\delta_{v,lim}$ which is multiplied by a factor k as a setpoint value for a steering angle control means or a steering torque control means.

5. The method as claimed in claim 4, wherein the steering torque control means is activated according to a relationship that is defined by the equation $\delta_{v,lim} < |\delta_v|$, wherein $\delta_v$ is defined as a wheel steering angle of a front axle of the vehicle.

6. The method as claimed in claim 4, wherein the steering torque control means is deactivated according to a relationship that is defined by the equation $\delta_{v,lim} < |\delta_v|$, wherein $\delta_v$ is defined as a wheel steering angle of a front axle of the vehicle.

7. A device for determining an optimum steering angle in understeer situations of a vehicle, comprising:
a determining unit configured to determine a stabilizing steering angle by accounting for a model-based portion of an adhesion coefficient, a model-based kinematic portion and an attitude angle; and
one of a steering angle control means or a steering torque control means configured to use the stabilizing steering angle or a stabilizing steering angle which is multiplied by a factor k as a setpoint value for controlling one of a steering angle or a steering torque, respectively.

* * * * *